(12) United States Patent
Ikeda

(10) Patent No.: US 7,131,067 B1
(45) Date of Patent: Oct. 31, 2006

(54) METHOD AND APPARATUS FOR EDITING AND PROCESSING A DOCUMENT USING A PRINTER DRIVER

(75) Inventor: Ikuyo Ikeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 706 days.

(21) Appl. No.: 09/669,854

(22) Filed: Sep. 27, 2000

(30) Foreign Application Priority Data

Sep. 27, 1999 (JP) ............................ 11-273185

(51) Int. Cl.
*G06F 15/00* (2006.01)
*G06F 3/00* (2006.01)

(52) U.S. Cl. ............ 715/530; 715/764; 715/527; 715/863; 715/517; 358/1.15

(58) Field of Classification Search ............ 715/530, 715/512, 517, 541, 764; 707/1, 10, 102, 707/104.1; 709/201, 217; 345/469, 764, 345/472, 801, 629; 358/1.14, 449, 474, 296, 358/1.15; 250/234; 382/194, 289; 400/477
See application file for complete search history.

(56) References Cited

U.S. PATENT DOCUMENTS

| | | | | |
|---|---|---|---|---|
| 5,260,805 A | * | 11/1993 | Barrett | 358/449 |
| 5,566,278 A | * | 10/1996 | Patel et al. | 358/1.15 |
| 5,732,230 A | * | 3/1998 | Cullen et al. | 345/764 |
| 6,069,637 A | * | 5/2000 | Gaglione et al. | 345/629 |
| 6,081,341 A | * | 6/2000 | Kim | 358/1.14 |
| 6,167,439 A | * | 12/2000 | Levine et al. | 709/217 |
| 6,173,088 B1 | * | 1/2001 | Koh et al. | 382/289 |
| 6,208,427 B1 | * | 3/2001 | Lee | 358/1.15 |
| 6,462,756 B1 | * | 10/2002 | Hansen et al. | 715/764 |
| 6,661,530 B1 | * | 12/2003 | Munetomo et al. | 358/1.15 |

FOREIGN PATENT DOCUMENTS

CN          1188360 A          7/1998

* cited by examiner

*Primary Examiner*—William Bashore
*Assistant Examiner*—Quoc A. Tran
(74) *Attorney, Agent, or Firm*—Oblon, Spivak, McClelland, Maier & Neustadt, P.C.

(57) ABSTRACT

A printing image forming apparatus in which a printer driver is installed. The printer driver forms a space in an image of an original document to be printed in which a note is inserted. An inserting device inserts text, images, graphics etc. as the note into the space formed, and a display indicating device displays a formed image on a screen of a display device as a preview. An operator can freely select and set the note by an operation of a button on a UI (User Interface) so as to edit the image of the page.

10 Claims, 2 Drawing Sheets

AN IMAGE ON AN ORIGINAL PAGE

AN AREA WHERE A NOTE AND COMMENT IS INSERTED

THE IMAGE ON A PAGE WITH A NOTE AND COMMENT INSERTED

THE IMAGE ON A PAGE WITH A NOTE AND COMMENT INSERTED

AN AREA WHERE A NOTE AND COMMENT IS INSERTED

AN IMAGE ON AN ORIGINAL PAGE

METHOD AND APPARATUS FOR EDITING AND PROCESSING A DOCUMENT USING A PRINTER DRIVER

CROSS REFERENCE TO RELATED DOCUMENTS

This document claims priority on and contains subject matter related to Japanese Patent Application No. 11-273185, filed on Sep. 27, 1999, and the entire contents of which are hereby incorporated herein by reference.

BACKGROUND OF THE INVENTION

1. Field of the Invention

The present invention relates to a printing image forming apparatus using a printer driver, and more particularly, to an image forming apparatus and image forming method in which a document image, instructed to be printed through the printer driver, can be printed after having been edited and processed in the printer driver instead of being edited and processed using an application. The present invention also relates to a recording medium in which a program to perform the image forming method is recorded, a print controlling apparatus with the program installed, and an image processing system including the print controlling apparatus and a printer.

2. Discussion of the Background

When an image to be printed is edited and processed with an image processing system, a document is edited and processed in an application because the editing can not be simply performed and processed by a printer driver. Therefore, especially when an image which has been edited and set is re-edited, it is hard to simply perform the editing operation.

SUMMARY OF THE INVENTION

The present invention has been made in view of the above-discussed and other problems and addresses the above-discussed and other problems.

The present invention advantageously provides a novel printing image forming apparatus enabling an operator to simply edit, on a printer driver, a document on a computer and to print the document.

The present invention further advantageously provides a novel printing method, novel print control apparatus, and novel image processing system, which also enable an operator to simply edit, on a printer driver, a document on a computer and to print the document.

According to an embodiment of the present invention, the printing image forming apparatus includes a spacing device to form a space in an image of an original document to be printed for inserting a note into a document on a computer, an inserting device to insert text, images, graphics, and so forth into the space formed on the page as the note, and a display indicating device to display the combined image on a screen of a display as a preview.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1B:
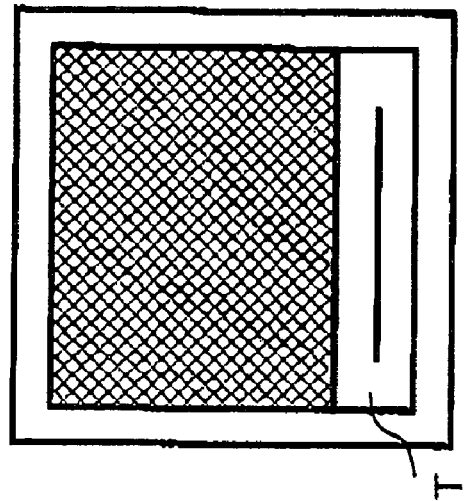
FIGS. 1A and 1B illustrate an image on an original page, and an image on a page obtained by an image forming apparatus according to the present invention, respectively.
Figure 1A:
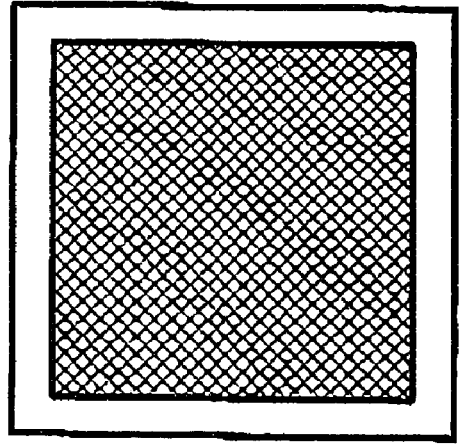

Referring now to the drawings, wherein like reference numerals designate identical or corresponding parts throughout the several views, FIGS. 1A and 1B explain an operation of a printer driver according to an embodiment of the present invention.

FIG. 1A illustrates an image of an original document to be printed on an original page, and FIG. 1B illustrates an image of the original document on a page in which a note is inserted into the original image. That is, the present invention can print an original document generated, for example, by a computer. FIG. 1A shows an image of an original page of the original document, FIG. 1B shows a combined image in which the original image of FIG. 1A is reduced and an area at the bottom of the image is left open so that a note can be inserted in that space. Thus, FIG. 1B illustrates an example of a combined image in which the original image is reduced and a comment as a note is inserted at a lower part of the original page.

A printing image forming apparatus using the printer driver according to the present invention includes an inserting device to insert text, images, graphics, etc. as a note into an original document produced on a computer when the original document is printed. The printing image forming apparatus also includes a spacing device to form a space for inserting the note by reducing an image on a page of the original document to be printed. The spacing device can freely move the reduced image in directions of top, bottom, right, and left, i.e. up-and-down and right-and-left, on the page when the note is inserted. The printing image forming apparatus further includes a display indicating device to display a combined image (as shown in FIG. 1B) on a screen of a display device as a preview.

Figure 2:
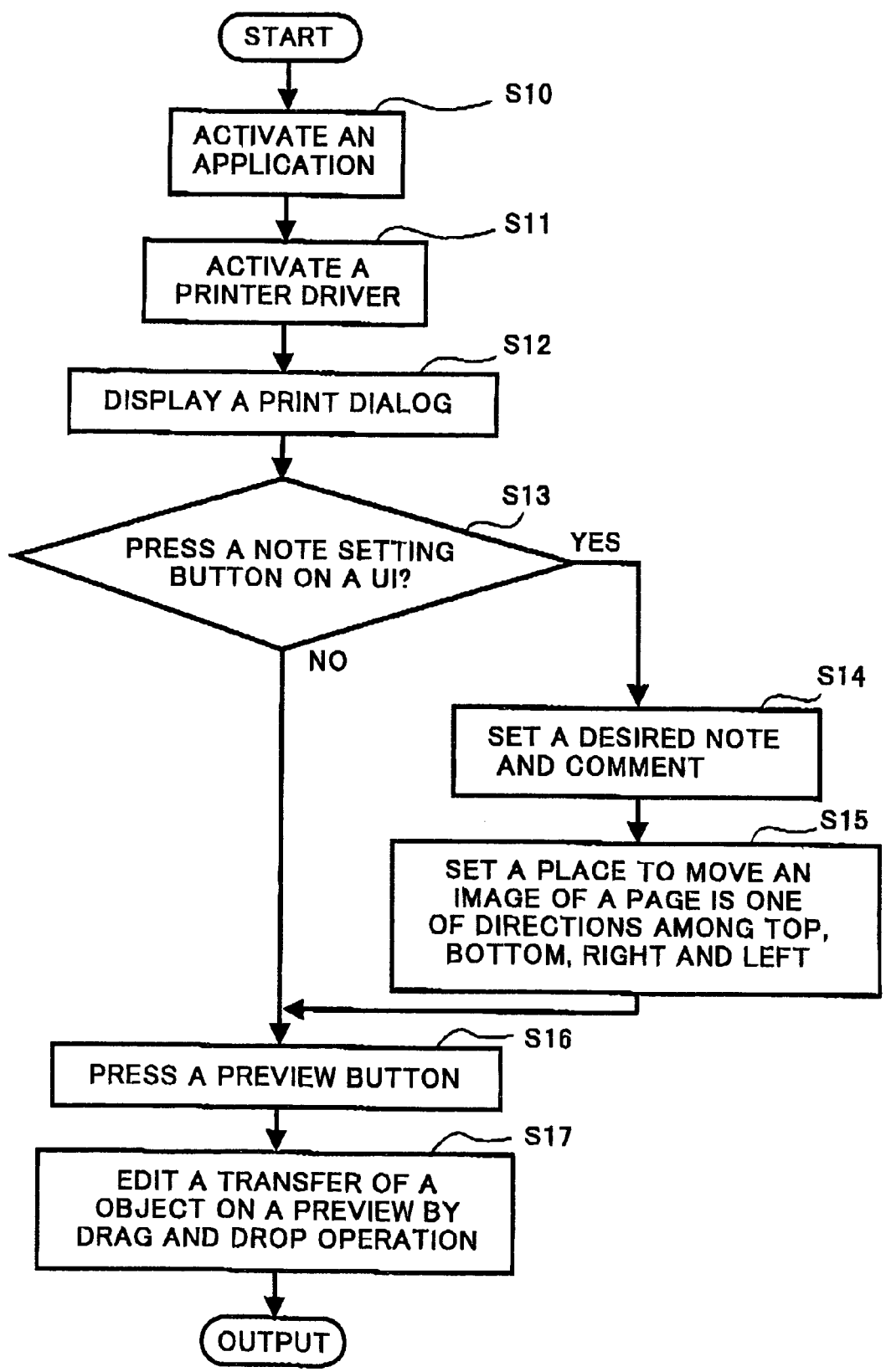
FIG. 2 is a flow chart for explaining a control method of the image forming apparatus according to the present invention.

FIG. 2 is a flow chart explaining a control method of the image forming apparatus having the above-described configuration. An application first is activated or started (step S10) to issue an order to print an original document. According to the issued order, a print dialog opens, and then a printer driver is activated to start to operate (step S11). A place where characters, images, or graphics are inserted as a note, e.g. a comment, is displayed on the print dialog of the printer driver (step S12).

A button for setting the note is prepared on a UI (User Interface) as a property of the printer driver so that an operator can select a designated operation of the button to move the note and comment (in the directions of top, bottom, right, and left). Whether the note setting button is selected is then determined (step S13). The operator sets a desired note and comment on the UI (step S14) after pressing the note setting button on the UI (i.e. after YES in step S13). The operator also sets a place where the note and comment is placed according to an indication prepared on the UI (step S15). Those settings are retained in the printer driver. Then, a printing region of an original document is reduced corresponding to a part where, for example, a note is inserted, and thereby, a place to insert the note is formed (as shown as the bottom portion in FIG. 1B). A combined image including the image of the original document and the note is displayed on the screen as a preview when a preview button prepared on the UI is pressed (step S16). During the operation, the objects can be simply transferred by a drag and drop operation so as to change or edit a layout on the preview (step S17). Thus, images can be easily edited. Accordingly, the apparatus displays the image that has been set on the page, and outputs the image.

A printing image forming apparatus according to the present invention may be realized by installing a recording medium, such as a CD-ROM, a flexible disk, and so forth in which a computer readable program to perform the above-described control method is recorded, in a computer, such as a microcomputer, and then operate the program. Further, when the above-described program is installed in a computer, the computer can be operated as a print control apparatus.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A printing image forming apparatus, comprising:
    a printer driver configured to be booted based on a received command to print a document from an application program, the printer driver comprising:
        a dialog device configured to display an image on a screen based on and after receiving the command to print a document as a preview of printing;
        an inserting device configured to insert at least one of a text, an image, and a graphic into the displayed image, wherein the at least one of the text, image, and graphic are assigned on the displayed image on the screen by a user;
        an image forming device configured to form an image by inserting the at least one of the text, image and graphic in a position specified by the user on the displayed image on the screen; and
        a display indicating device configured to display the formed image on the screen.

2. A printing image forming apparatus according to claim 1, wherein:
    the inserting device reduces the image to be printed and moves the reduced image in up-and-down and right-and-left directions on the screen so as to form a space for inserting the at least one of the text, image, and graphic.

3. A printing image forming apparatus according to claim 1, wherein:
    the displayed formed image includes a combined image of an original document and the inserted at least one of the text, image, and graphic, and the combined image is edited by a drag and drop operation on the preview of printing.

4. A recording medium recorded with a computer readable printer driver program performing the steps of:
    receiving a command to print a document;
    displaying an original document on a screen as a preview of printing based on and after receiving the command to print a document;
    receiving at least one of a text, an image, and a graphic to be inserted into an image of the displayed original document from a user;
    receiving a position specified by the user on the displayed image on the screen so as to form a space for inserting the at least one of the text, image, and graphic;
    inserting the at least one of the text, image, and graphic into the formed space; and
    displaying a combined image on the screen.

5. A print controlling apparatus, comprising:
    a computer in which the printer driver program according to claim 4 is installed.

6. An image processing system, comprising:
    a print controlling apparatus according to claim 5; and
    a printer.

7. A printing image forming apparatus, comprising:
    a printer driver configured to be booted based on a received command to print a document from an application program, the printer driver comprising:
        means for displaying an image on a screen based on and after receiving the command to print a document as a preview of printing;
    means for inserting at least one of a text, an image, and a graphic into the displayed image, wherein the at least one of the text, image, and graphic are assigned on the displayed image on the screen by a user;
    means for forming an image by inserting the at least one of the text, image, and graphic in a position specified by the user on the displayed image on the screen; and
    means for displaying the formed image on the screen.

8. A printing image forming apparatus according to claim 7, wherein:
    the means for inserting reduces the image to be printed and moves the reduced image in up-and-down and right-and-left directions on the screen so as to form a space for inserting the at least one of the text, image, and graphic.

9. A printing image forming apparatus according to claim 7, wherein:
    the displayed formed image includes a combined image of an original document and the inserted at least one of the text, image, and graphic, and the combined image is edited by a drag and drop operation on the preview of printing.

10. A method for forming a printing image performing the steps of:
    receiving a command to print a document;
    displaying an original document on a screen as a preview of printing based on and after receiving the command to print a document;
    receiving at least one of a text, an image, and a graphic to be inserted into an image of the displayed original document from a user;
    receiving a position specified by the user on the displayed image on the screen so as to form a space for inserting the at least one of the text, image, and graphic;
    inserting the at least one of the text, image, and graphic into the formed space; and
    displaying a combined image on the screen.

* * * * *